US008576352B2

(12) United States Patent
Zhu et al.

(10) Patent No.: US 8,576,352 B2
(45) Date of Patent: Nov. 5, 2013

(54) BACKLIGHT MODULE COMPRISING AN INTEGRALLY JOINED LIGHT GUIDE PLATE STRUCTURE HAVING AT LEAST ONE GROOVE DIVIDING THE LIGHT GUIDE PLATE INTO A PLURALITY OF SUB-LIGHT GUIDE PLATES WHEREIN THE AT LEAST ONE GROOVE IS FILLED WITH A REFLECTIVE MATERIAL

(75) Inventors: Jun Zhu, Beijing (CN); Yan Zhao, Beijing (CN); He Zhang, Beijing (CN); Guo-Fan Jin, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 401 days.

(21) Appl. No.: 12/848,222

(22) Filed: Aug. 2, 2010

(65) Prior Publication Data
US 2011/0109839 A1 May 12, 2011

(30) Foreign Application Priority Data
Nov. 10, 2009 (CN) .......................... 2009 1 0109713

(51) Int. Cl.
*G02F 1/1335* (2006.01)
*G09F 13/04* (2006.01)
*F21V 7/04* (2006.01)

(52) U.S. Cl.
USPC ............................. 349/63; 362/97.3; 362/612

(58) Field of Classification Search
USPC ..................... 349/61–65; 362/97.1–97.4, 312
See application file for complete search history.

(56) References Cited

U.S. PATENT DOCUMENTS

| 2006/0002146 A1 | 1/2006 | Baba |
| 2007/0165395 A1* | 7/2007 | Yang ............................. 362/97 |
| 2008/0266880 A1 | 10/2008 | Chang |

FOREIGN PATENT DOCUMENTS

| CN | 1716042 | 1/2006 |
| CN | 101206280 | 6/2008 |
| CN | 101295040 | 10/2008 |
| TW | 200725110 | 7/2007 |
| TW | 200846591 | 12/2008 |

* cited by examiner

*Primary Examiner* — Paul Lee
(74) *Attorney, Agent, or Firm* — Altis & Wispro Law Group, Inc.

(57) ABSTRACT

A backlight module includes a light guide plate and at least two groups of light sources. The light guide plate includes at least two independent light guide modules optically isolated from each other. Each group of light sources is located corresponding to an independent light guide module and controlled independently. A liquid crystal display using the backlight module is also related.

2 Claims, 12 Drawing Sheets

BACKLIGHT MODULE COMPRISING AN INTEGRALLY JOINED LIGHT GUIDE PLATE STRUCTURE HAVING AT LEAST ONE GROOVE DIVIDING THE LIGHT GUIDE PLATE INTO A PLURALITY OF SUB-LIGHT GUIDE PLATES WHEREIN THE AT LEAST ONE GROOVE IS FILLED WITH A REFLECTIVE MATERIAL

CROSS-REFERENCE TO RELATED APPLICATIONS

This application claims all benefits accruing under 35 U.S.C. §119 from China Patent Application No. 200910109713.0, filed on Nov. 10, 2009 in the China Intellectual Property Office, disclosure of which is incorporated herein by reference.

BACKGROUND

1. Technical Field

The present disclosure relates to a backlight module and liquid crystal display using the same.

2. Description of Related Art

Currently, because liquid crystal displays (LCDs) are thin, lightweight, long lasting, and consume little power, they are extensively used in a variety of electronic devices. However, liquid crystal displays are not self-luminescent, therefore, backlight modules are typically required.

Liquid crystal display, according to the prior art usually includes a liquid crystal panel and a backlight module. The backlight module includes a light guide plate, a reflective plate, and a light source such as light emitting diode (LED). The light guide plate has a light inputting surface and a light outputting surface opposite to the light inputting surface. The light source is located adjacent to the light inputting surface. The reflective plate is located on the side of the light inputting surface. During use, the light radiated from the light source enters the light guide plate from the light inputting surface and leaves the light guide plate through the light outputting surface to form uniform planar light. The planar light illuminates the liquid crystal panel so that the liquid crystal panel displays images. However, a power consumption of the liquid crystal display is high because the entire backlight source is kept in the illumination state and does not change according to the change of the image display.

What is needed, therefore, is to provide a backlight module and a liquid crystal display using the same that has low power consumption.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present backlight module and liquid crystal display.

Figure 1:
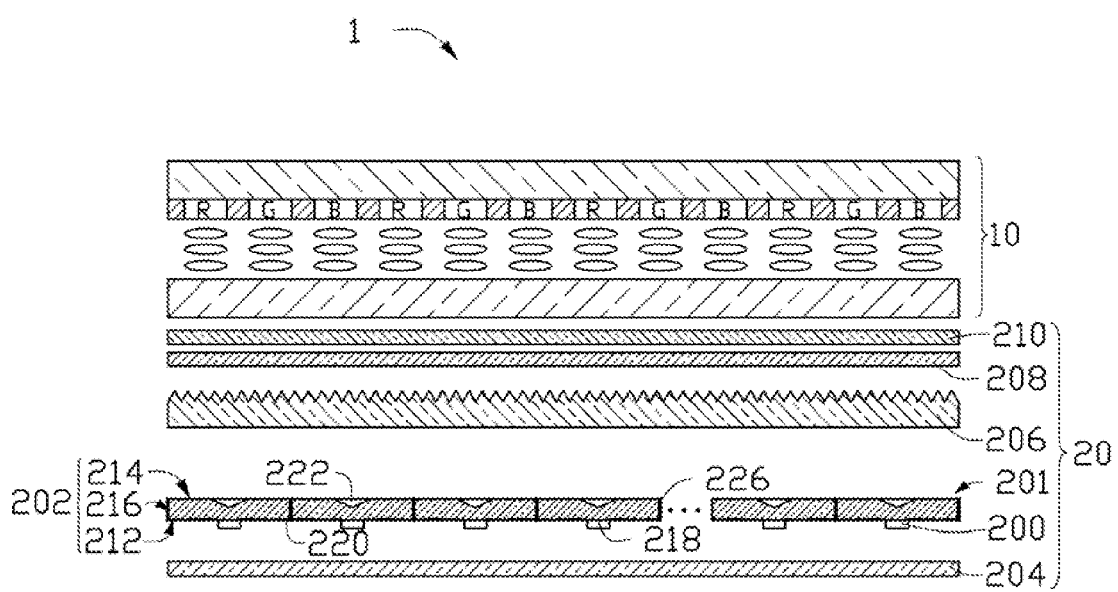
FIG. 1 is an exploded, cross-sectional view of one embodiment of a liquid crystal display.
Figure 2:
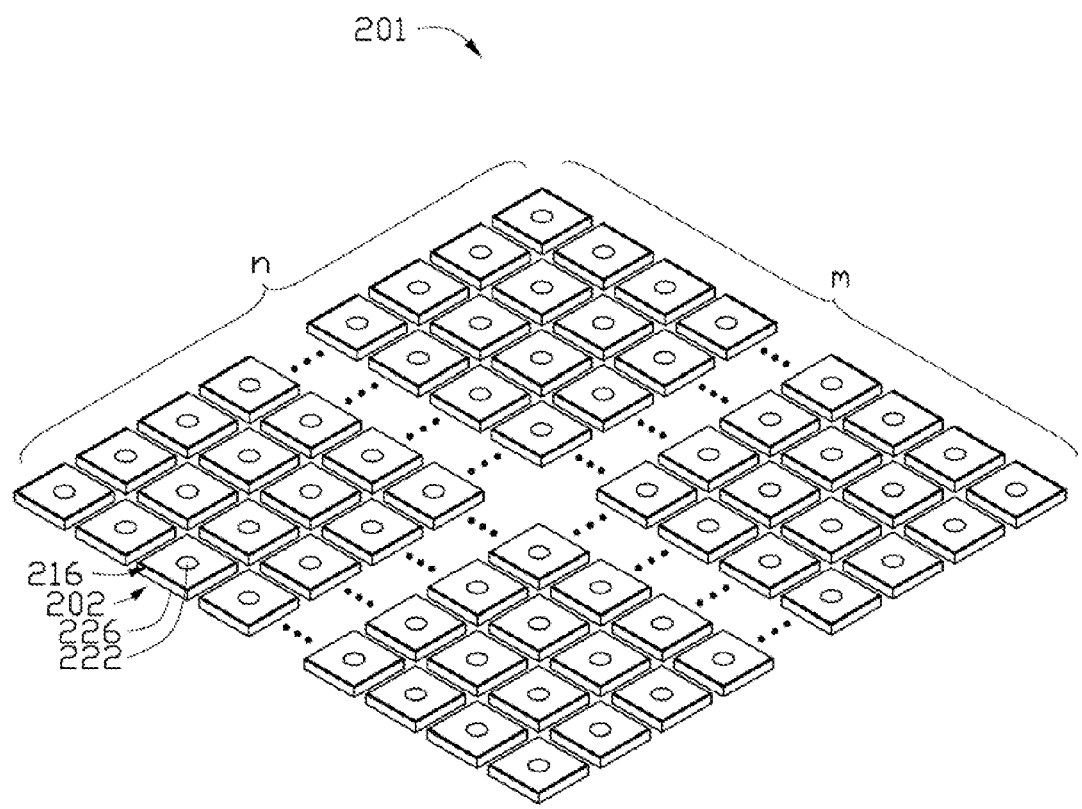
FIG. 2 is an isotropic view of a backlight module of the liquid crystal display of FIG. 1.

Referring to FIGS. 1 and 2, a liquid crystal display 1 of one embodiment includes a liquid crystal panel 10 and a backlight module 20. The backlight module 20 is configured to provide planar light for the liquid crystal panel 10. The liquid crystal panel 10 is configured for image display.

The backlight module 20 includes a light source 200, a light guide plate 201, a reflective plate 204, a microprism plate 206, a polarization plate 208 and a diffusing plate 210. The reflective plate 204, the light guide plate 201, the microprism plate 206, the polarization plate 208 and the diffusing plate 210 are located in sequence. The light source 200 is located adjacent to a light inputting surface of the light guide plate 201.

The light guide plate 201 includes at least two sub-light guide plates 202. Each sub-light guide plate 202 has a light inputting surface 212, a light outputting surface 214 opposite to the light inputting surface 212, and at least one lateral side 216. A large light guide plate 201 can be formed by assembling a plurality of sub-light guide plates 202 together. The plurality of sub-light guide plates 202 can be assembled side by side. The light outputting surfaces 214 and the light inputting surfaces 212 of adjacent sub-light guide plates 202 can be coplanar. Adjacent lateral sides 216 of adjacent sub-light guide plates 202 are near or contact with each other. At least one of the joined adjacent lateral sides 216 of adjacent sub-light guide plates 202 has a first reflective structure 226 thereon so that each two adjacent sub-light guide plates 202 are optically isolated. Namely, there is no light mixture between different sub-light guide plates 202. The first reflective structure 226 can be a reflective film, a plurality of microstructures formed by erosion, or reflective material. The sub-light guide plate 202 can be a transparent plate in a round, square, rectangle, polygon, or other shape. The thickness of the sub-light guide plate 202 is arbitrary, and can be selected according to need. The sub-light guide plate 202 can be made of plastic, polymethyl methacrylate (PMMA) or glass.

The light sources 200 can be fastened on some portion of the liquid crystal display 1, e.g. a housing of the liquid crystal display 1. The light source 200 can be a point light source such as a fluorescent lamp or LED. In one embodiment, the light source 200 is a monochromatic LED. The backlight module 20 includes a plurality of light sources 200. Each light source 200 is located corresponding to one sub-light guide plate 202. Furthermore, a driving circuit (not shown) can be provided to drive and control the backlight module 20. In one embodiment, the driving circuit includes a plurality of LED drivers (not shown) with each LED driver corresponding to one LED light source 200.

In one embodiment, the sub-light guide plate 202 is a square PMMA plate with a side length of 5 millimeters. The first reflective structure 226 is reflective film. Referring to FIG. 2, the number of the sub-light guide plates 202 can be n×m, wherein 'n' is the number of rows, and n>2; 'm' is the number of columns, and m>2. Location of the sub-light guide plate 202 is represented as $X_{i \times j}$, wherein T is a number from 1 to n, is a number from 1 to m. The sub-light guide plates 202 of $X_{1 \times j}, X_{2 \times j} \ldots X_{n \times j}$ are located in sequence on the same column and the sub-light guide plates 202 of $X_{i \times 1}, X_{i \times 2} \ldots X_{i \times m}$, are located in sequence on the same row. The lateral side 216 of the sub-light guide plates 202 of $X_{1 \times j}$ opposite to the sub-light guide plates 202 of $X_{2 \times j}$ is coated with reflective film. The lateral side 216 of the sub-light guide plates 202 of $X_{2 \times j}$ opposite to the sub-light guide plates 202 of $X_{3 \times j}$ is coated with reflective film. Thus, the lateral side 216 of the sub-light guide plates 202 of opposite to the sub-light guide plates 202 of $X_{n \times j}$ is coated with reflective film. The lateral side 216 of the sub-light guide plates 202 of $X_{i \times 1}$ opposite to the sub-light guide plates 202 of $X_{i \times 2}$ is coated with reflective film. The lateral side 216 of the sub-light guide plates 202 of $X_{i \times 2}$ opposite to the sub-light guide plates 202 of $X_{i \times 3}$ is coated with reflective film. On the analogy of this, the lateral side 216 of the sub-light guide plates 202 of $X_{i \times (m-1)}$ opposite to the sub-light guide plates 202 of $X_{i \times m}$ is coated with reflective film. In addition, the outer lateral sides 216 of the light guide plates 201 are coated with reflective film. In one embodiment, each lateral side 216 of the sub-light guide plates 202 is coated with reflective film.

Figure 5:
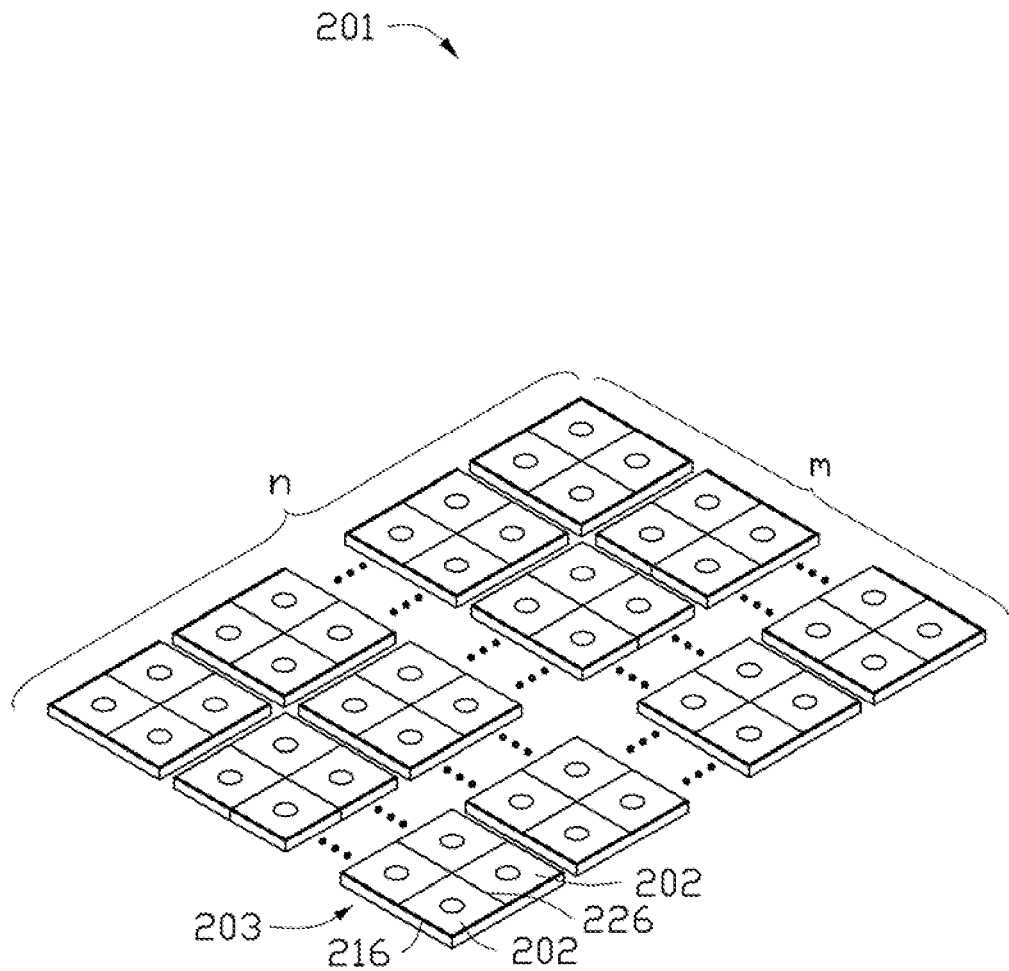
FIG. 5 is an isotropic view of a backlight module of another embodiment of the liquid crystal display of FIG. 1.

In another embodiment, several sub-light guide plates 202 can form a sub-light guide plates group 203. Referring to FIG. 5, each four sub-light guide plates 202 are arranged in array to form a sub-light guide plates group 203. The number of the sub-light guide plates group 203 can be n×m, wherein 'n' is the number of rows, and n>2; 'm' is the number of columns, and m>2. There is no reflective structure between adjacent sub-light guide plates 202 of the same sub-light guide plates group 203. Namely, the light in different sub-light guide plates 202 of the same sub-light guide plates group 203 can be mixed. However, at least one of the joined adjacent lateral sides of adjacent sub-light guide plates group 203 has a first reflective structure 226 thereon, so that each two adjacent sub-light guide plates group 203 are optically isolated. Namely, there is no light mixture between different sub-light guide plates group 203. The number of the LED driver can be same as the number of the sub-light guide plates group 203. Each LED driver can be used to drive and control the LED light sources 200 corresponding to the same sub-light guide plates group 203.

Figure 3:
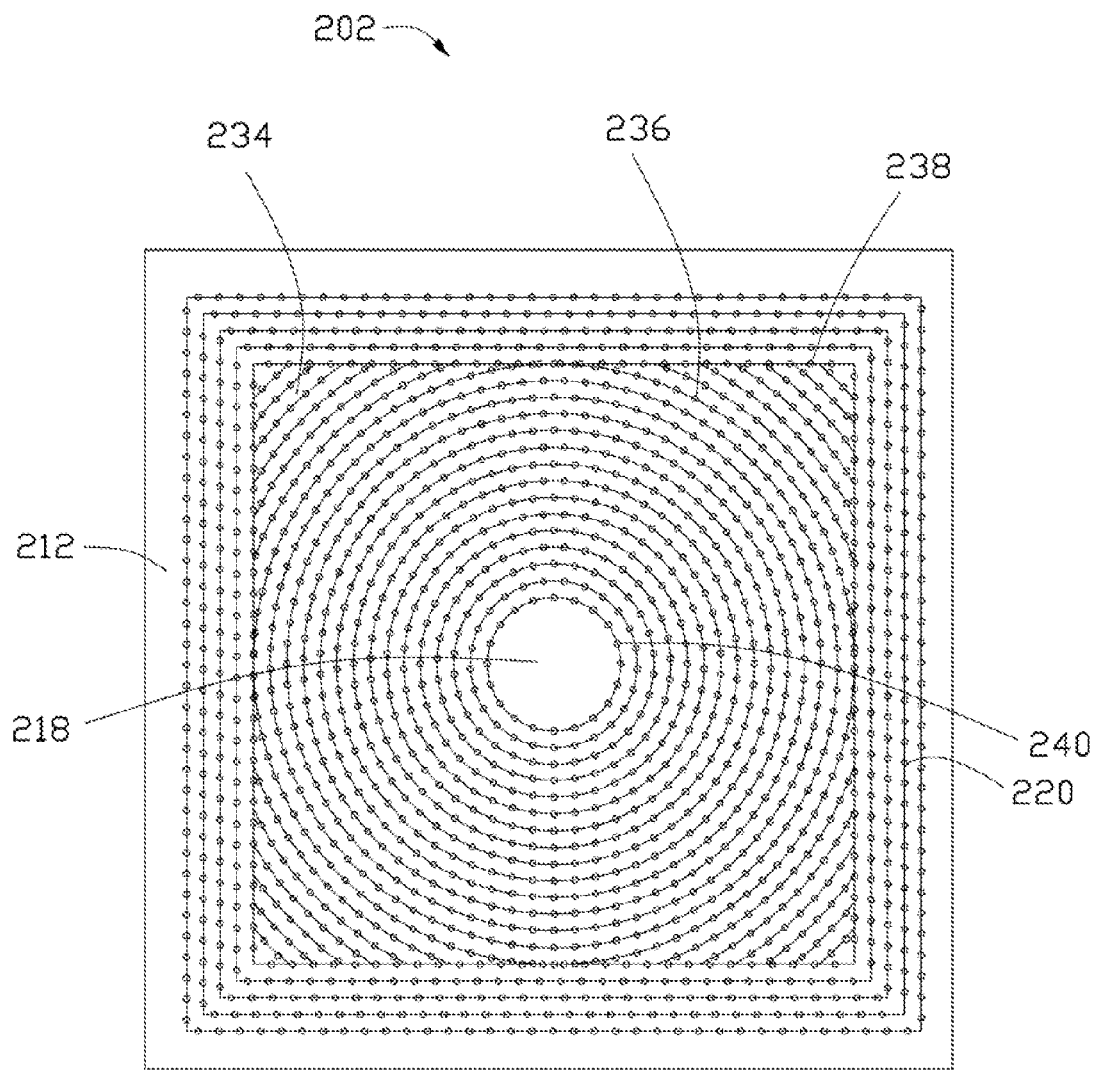
FIG. 3 is a schematic top view of the sub-light guide plate of the backlight module of FIG. 2.

Referring to FIG. 3, the light inputting surface 212 of the sub-light guide plate 202 can have a plurality of scattering dots 220 located around a center 218. The scattering dots 220 can be arranged in the form of a plurality of concentric shapes about the center 218. The shapes can be round, ellipsoidal or polygonal or combinations thereof. The adjacent two shapes are located equidistantly and a distance between the adjacent two shapes ranges from about 0.5 millimeter to about 2 millimeters. The density of the scattering dots 220 can increase further away from the center 218 to the sides so as to maintain a uniform light output as the intensity of light reduces away from the center 218 to the sides. The scattering dots 220 on the same shape are located uniformly. A distance between the adjacent two scattering dots 220 on the same shape ranges from about 0.1 millimeters to about 1 millimeter. The density of the scattering dots 220 on each shape can increase further away from the center 218. The scattering dots 220 can be protruding, concave or a combination thereof. The shape of the scattering dots 220 can be triangular, square, rhombic, round or a combination thereof. Effective diameters of the scattering dots 220 range from about 0.1 millimeters to about 0.5 millimeters. The scattering dots 220 can be made of ink, Ti-related materials, or Si compound. The exposed surfaces of the scattering dots 220 can be coated with highly reflective material (not shown). The scattering dots 220 are configured to scatter incident light propagating within the sub-light guide plate 202, and thereby uniformly transmit the light to the light outputting surface 214.

When the light beam radiated from the light source 200 is column-shaped, the scattering dots 220 adjacent to the center 218 can be arranged in the form of a plurality of concentric circles around the center 218. The scattering dots 220 adjacent to the edge of the light inputting surface 212 can be arranged in the form of a plurality of concentric polygons around the center 218. The shape of the polygons can be substantially the same as the shape of the sub-light guide plate 202. The ratio of the number of circles to the number of polygons can be less than 20:1. The scattering dots 220 in an area 234, between the most outside of concentric circle and the most inside of concentric polygon, are arranged in a plurality of circular arcs. In one embodiment, the sub-light guide plate 202 is a square plate with a side length of 50 millimeters. There are 15 circles and 5 polygons. The diameter of the first circle 240 adjacent to the center 218 can be larger than 8 millimeters so that the light beam can directly enter the sub-light guide plate 202. The last circle 236 is tangential to the first polygon 238. A distance between adjacent two shapes is about 1 millimeter. A distance between the adjacent two scattering dots 220 on the same shape is about 0.6 millimeters. The scattering dots 220 are half-ball concave dents in the light guide plate. A diameter of the half-ball concave is about 0.3 millimeters.

Figure 4:
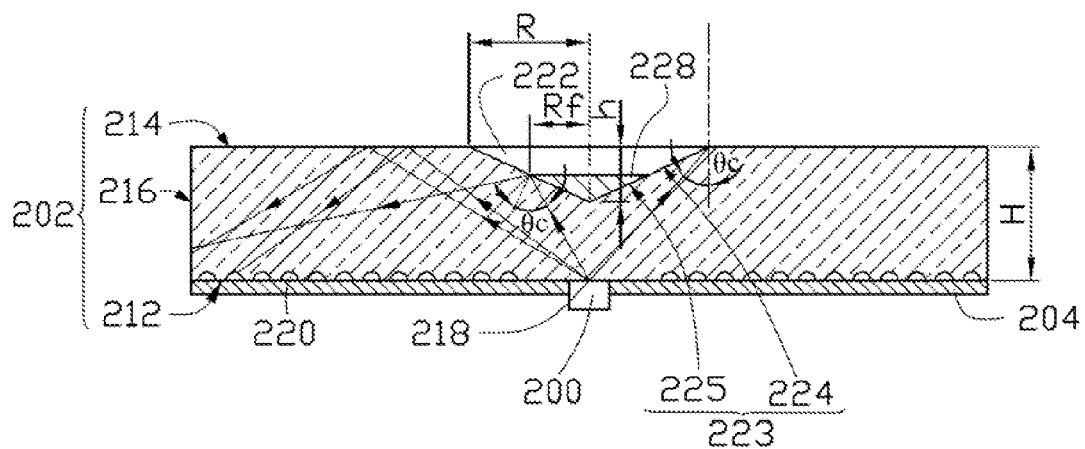
FIG. 4 is an exploded, cross-sectional view of the sub-light guide plate of the backlight module of FIG. 2.

Referring to FIG. 4, a recess 222 is defined in the sub-light guide plate 202 at the light outputting surface 214. The recess 222 is concaved toward the center 218. The recess 222 has a reflective surface 223 such as a curved surface like hemispherical surface, a hyperboloid, or a conic surface, or surfaces deformed like a pyramidal surface. The reflective surface 223 is configured to reflect part of the light from the corresponding light source 200 to the inside of the sub-light guide plate 202. The light reflected into the sub-light guide plate 202 by the reflective surface 223 can be scattered by the scattering dots 220 and hit the light outputting surface 214 uniformly. Thus, the uniformity of illumination of the backlight module 20 is improved. The shape of the reflective surface 223 is not limited to what is described and is illustrated above. Any suitable shapes that allow the reflective surface 223 to redirect light into the sub-light guide plate 202 may be employed.

The reflective surface 223 can include a first area 224 and a second area 225. A first light incident angle in the first area 224 is greater than a total reflection critical angle of the sub-light guide plate 202, and a second light incident angle in the second area 225 is smaller than the total reflection critical angle of the sub-light guide plate 202. A second reflective structure 228 can be located on the second area 225. The second reflective structure 228 can be a reflective film, a plurality of microstructures formed by erosion, or reflective material filled in the recess 222. In one embodiment, the recess 222 is formed by removing a revolving body defined by boring about a center axis of the light guide plate 202. The shape of the recess 222 is a cone having a round bottom surface (not labeled) and a peak (not labeled). A semidiameter R of the round bottom surface satisfies the following formula: R=H*tan $\theta_c$, where, 'H' is the thickness of the sub-light guide plate 202; and '$\theta_c$' is the total reflection critical angle of the sub-light guide plate 202. For example, if the sub-light guide plate 202 is made of PMMA, the $\theta_c$ of the sub-light guide plate 202 is 42 degrees. When the thickness H of the sub-light guide plate 202 is 2 millimeters, and the semidiameter R of the round bottom surface is 1.8 millimeters. A light incident angle in an area of the light outputting surface 214 beside the reflective surface 223 is greater than the total reflection critical angle of the sub-light guide plate 202 because the semidiameter R of the round bottom surface satisfies the following formula: R=H*tan $\theta_c$.

In one embodiment, the reflective surface 223 is a conic surface with a center line overlapping the center axis of the sub-light guide plate 202. A critical reflection ring (not labeled) is defined where the first area 224 adjoins the second area 225. A semidiameter $R_f$ of the critical reflection ring satisfies the following formula:

$$R_f = (h - H) * \frac{\sin\alpha}{\cos\theta_c} * \cos(\alpha + \theta_c)$$

where, 'h' is a depth of the conical recess 222, and 0<h<H; '$\alpha$' is a cone angle of the conical recess 222, and $$\alpha = \tan^{-1}\left(\frac{R}{h}\right).$$

When h=2 millimeters, $R_f$=1.247 millimeters.

Furthermore, a plurality of scattering dots (not shown) can be located on the area of the light outputting surface 214 beside the reflective surface 223.

The shape and the area of the reflective plate 204 are the same as that of the sub-light guide plate 202. The thickness of the reflective plate 204 is arbitrary, and can be selected according to need. Part of the reflective plate 204 opposite to the light source 200 is transparent or hollow so that the light eradiated from the light source 200 can enter the sub-light guide plate 202 directly. In one embodiment, part of the reflective plate 204 opposite to the light source 200 is hollow. The reflective plate 204 further includes a reflective film (not shown) located on the surface of the reflective plate 204 opposite to the sub-light guide plate 202. The light striking on the light inputting surface 212 of the sub-light guide plate 202 can be reflected back into the light guide plate 201. Thus, the uniformity of illumination of the backlight module 20 can be improved.

The microprism plate 206, the polarization plate 208 and the diffusing plate 210 are located in sequence above the light outputting surface 214 of the sub-light guide plate 202. The microprism plate 206 is configured to better focus light along desired paths. The polarization plate 208 is located between the microprism plate 206 and the diffusing plate 210. The polarization plate 208 is configured to polarize and modulate the light passing there through. The diffusing plate 210 is configured to enhance the uniformity of distribution of light that passes from the backlight module 20 to the display panel.

For enhancing reflection efficiency, the light inputting surface 212 can be coated with highly reflective material (not shown). In addition, the backlight module 20 can further include an optical film (not shown), such as a brightness enhancement film (BEF) or a light scattering film, located above the light outputting surface 214. The optical film increases the brightness of the liquid crystal panel 10 of the liquid crystal display 1.

During use of the liquid crystal display 1, each of the LED light sources 200 is drove and controlled by a LED driver. When an area of the liquid crystal display 1 needs to display a black image, the LED light sources 200 configured to illuminate the area can be turned off. Thus, no light is getting out of the light outputting surface 214 opposite to the area and the corresponding area of the liquid crystal panel 10 so it can display the black image. When an area of the liquid crystal display 1 needs to display a white or color image, the LED light sources 200 are configured to illuminate the area that can be turned on. The light is radiated from the LED light source 200 and enters the sub-light guide plate 202. Then, the light leaves the sub-light guide plate 202 through a refraction of the light outputting surface 214. The light illuminates the area of the liquid crystal panel 10 so that it displays the white or color image.

The liquid crystal display 1 has following advantages. Firstly, each sub-light guide plate 202 in FIG. 2 or sub-light guide plate group 203 in FIG. 5 can be seen as an independent light guide module illuminated by one or four independent LED light sources 200. Because there is no light mixture between the adjacent independent light guide modules, a brightness of each independent light guide module will not be influenced by the other neighbor independent light guide modules. When part of the liquid crystal display 1 displays a black image and part of the liquid crystal display 1 displays a white or color image, the liquid crystal panel 10 corresponding to the area of black image can have no light illumination and the liquid crystal panel 10 corresponding to the area of white or color image can be brightly illuminated. Therefore, the brightness contrast or brightness dynamic contrast of the liquid crystal display 1 can be improved. Secondly, because part of the LED light sources 200 can be turned off sometimes according to the change of the image, the lifespan of the LED light sources 200 increases and the power waste of the backlight module 20 decreases.

Figure 6:
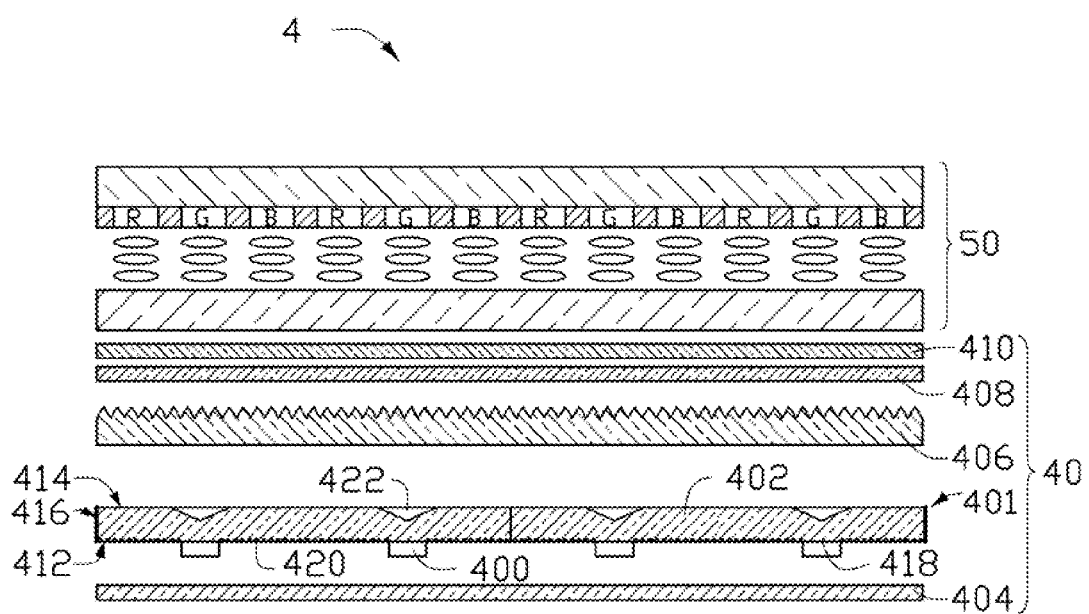
FIG. 6 is an exploded, cross-sectional view of another embodiment of a liquid crystal display.
Figure 7:
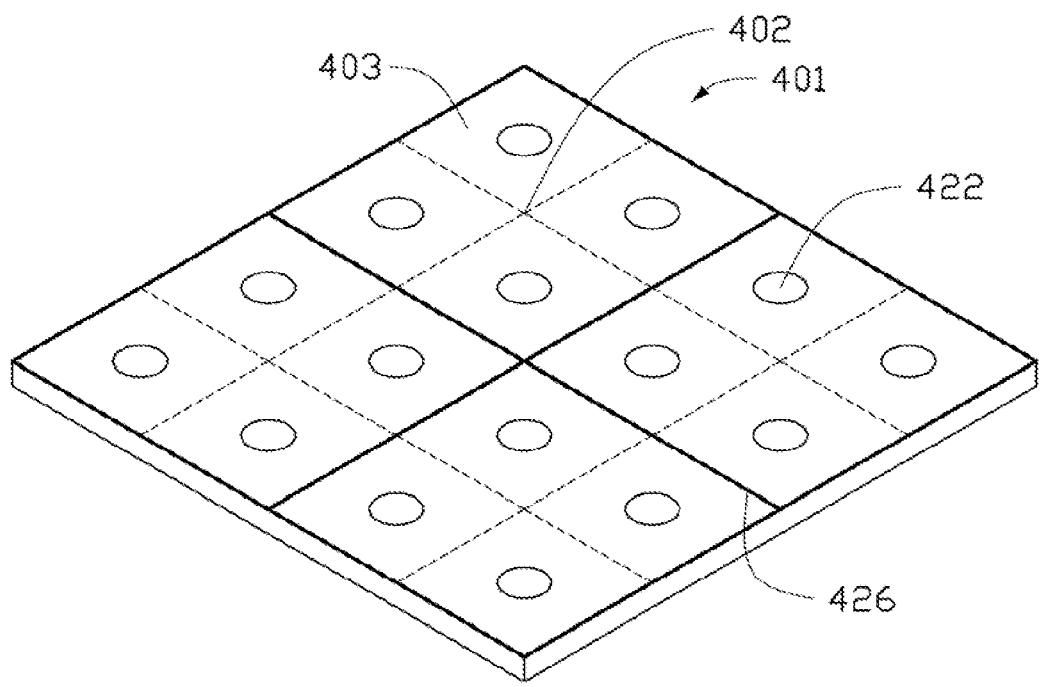
FIG. 7 is an isotropic view of one embodiment of a backlight module of the liquid crystal display of FIG. 6.

Referring to FIGS. 6 and 7, a liquid crystal display 4 of a second embodiment includes a liquid crystal panel 50 and a backlight module 40. The backlight module 40 is configured to provide planar light for the liquid crystal panel 50. The liquid crystal panel 50 is configured for image display.

The backlight module 40 includes a light source 400, a light guide plate 401, a reflective plate 404, a microprism plate 406, a polarization plate 408 and a diffusing plate 410. The reflective plate 404, the light guide plate 401, the microprism plate 406, the polarization plate 408 and the diffusing plate 410 are located in sequence. The light source 400 is located adjacent to a light inputting surface of the light guide plate 401.

The light guide plate 401 has a light inputting surface 412, a light outputting surface 414 opposite to the light inputting surface 412, and at least one lateral side 416. The light inputting surface 412 can have a plurality of scattering dots 420 located thereon. The light guide plate 401 on the light outputting surface 414 defines a plurality of recesses 422. The light guide plate 401 includes at least two independent light guide modules 402 optically isolated by a first reflective structure

426. The first reflective structure 426 can be a reflective film, a plurality of microstructures formed by erosion, or a reflective material.

In one embodiment, the light guide plate 401 includes four same square independent light guide modules 402 optically isolated by the reflective material filled in a groove of the light guide plate 401. The light guide plate 401 can be made by the following steps of:

step (a): providing a square PMMA plate;

step (b): cutting the PMMA plate from a surface top by a laser to form a cross shaped groove, wherein the groove does not get through the PMMA plate, so that the light inputting surface of the PMMA plate is joined; and step (c): filling the reflective material into the cross shaped groove.

In another embodiment, the light guide plate 401 can be made by injecting PMMA materials in a mould having two crossed reflective sheets therein.

Each independent light guide module 402 can include four same square sub-optical modules 403. Each sub-independent light guide module 402 has a center 418 on the light inputting surface 412 and a recess 422 at the light outputting surface 414. The recess 422 is opposite to the center 418. The recess 422 is same as the recess 222 described above. A plurality of scattering dots 420 is located around the center 418 on the light inputting surface 412 of the sub-optical modules 403. The structure and distribution of the scattering dots 420 are same as that of the scattering dots 220 described above.

In other embodiments, the light guide plate 401 can include scattering dots 420 formed on the light outputting surface 414. Alternatively, the light guide plate 401 can include scattering dots 420 formed on both the light inputting surface 412 and the light outputting surface 414. When the scattering dots 420 are formed at both the light inputting surface 412 and the light outputting surface 414, the light beam between the light inputting surface 412 and the light outputting surface 414 can be reflected many times by the scattering dots 420, thus, the uniformity of light output can be further improved.

The light source 400 can be a point light source such as a fluorescent lamp or LED. The light source 400 can be located adjacent to the center 418. In one embodiment, the light source 400 is a monochromatic LED. A driving circuit (not shown) can be provided to drive and control the backlight module 40. In one embodiment, the driving circuit includes four LED drivers (not shown) with each LED driver being configured to drive and control four LED light sources 400 which corresponds to the same one optical module 402.

The reflective plate 404 is located adjacent to the light inputting surface 412. Part of the reflective plate 404 opposite to the light source 400 is transparent or hollow so that the light eradiated from the light source 400 can enter the light guide plate 401 directly. In one embodiment, part of the reflective plate 404 opposite to the light source 400 is hollow. The microprism plate 406, the polarization plate 408 and the diffusing plate 410 are same as the microprism plate 206, the polarization plate 208 and the diffusing plate 210 described above.

For enhancing reflection efficiency, the light inputting surface 412 and the lateral side 416 can be coated with highly reflective material (not shown). In addition, the backlight module 40 can further include an optical film (not shown), such as a brightness enhancement film (BEF) or a light scattering film, located above the light outputting surface 414.

Referring to FIGS. 8-12, the light guide plate 401 defines an accommodation 419 on the light inputting surface 412. The accommodation 419 is configured for accommodating the light source 400. The accommodation 419 is a concave cavity turned towards the light outputting surface 414 of the light guide plate 401 at the center 418. An inner surface of the accommodation 419 can be a curved surface like hemispherical surface, a hyperboloid, or a conic surface, or surfaces deformed like a pyramidal surface. The shape of the accommodation 419 can be same as or different from the shape of the recess 422. A depth or height $h_0$ of the accommodation 419 satisfies the condition of $0 < h_0 < (H-h)$, where, 'h' is a depth of the recess 422, and 'H' is the thickness of the light guide plate 401. The recess 422 and the accommodation 419 can be formed by boring about a center axis through the center 418. In one embodiment, a plurality of accommodations 419 is defined in the light guide plate 401.

Figure 8:
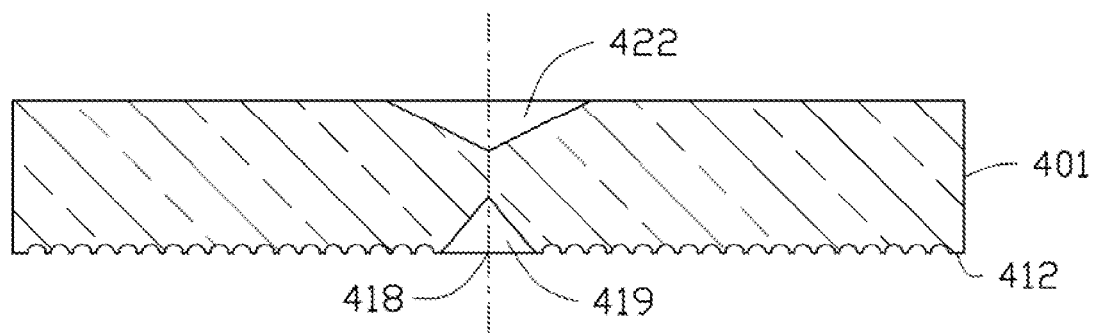
FIG. 8 is a cross-sectional view of one embodiment of a light guide plate of the backlight module of FIG. 7.

In one embodiment, both the recess 422 and the accommodation 419 are bored out with a bit, and the shape of the recess 422 and the accommodation 419 is a cone as shown in FIG. 8.

Figure 9:
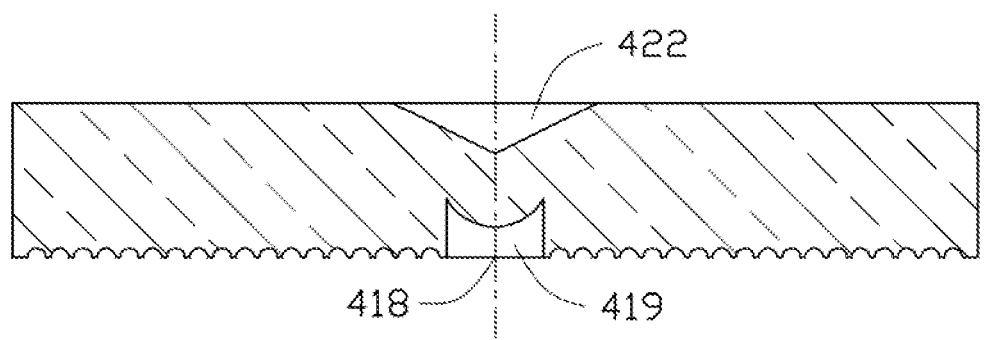
FIG. 9 is a cross-sectional view of one embodiment of a light guide plate of the backlight module of FIG. 7.

In one embodiment, the shape of the recess 422 is a cone, and the shape of the accommodation 419 is a cylinder having a curve top surface as shown in FIG. 9.

Figure 10:
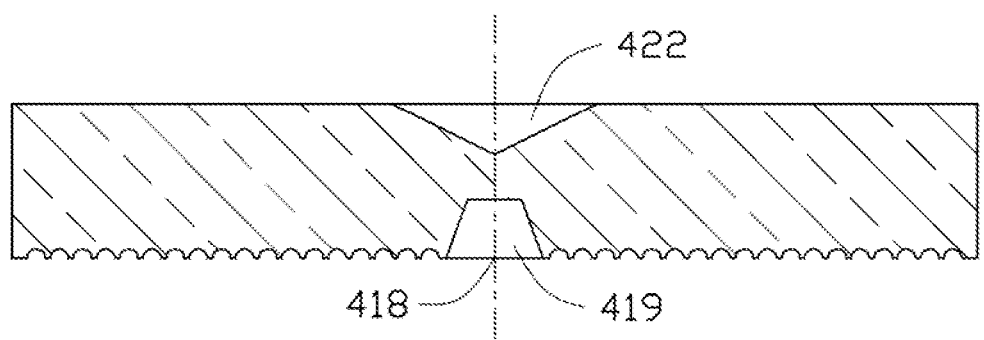
FIG. 10 is a cross-sectional view of one embodiment of a light guide plate of the backlight module of FIG. 7.

In one embodiment, the shape of the recess 422 is a cone, and the shape of the accommodation 419 is a frustum as shown in FIG. 10.

Figure 11:
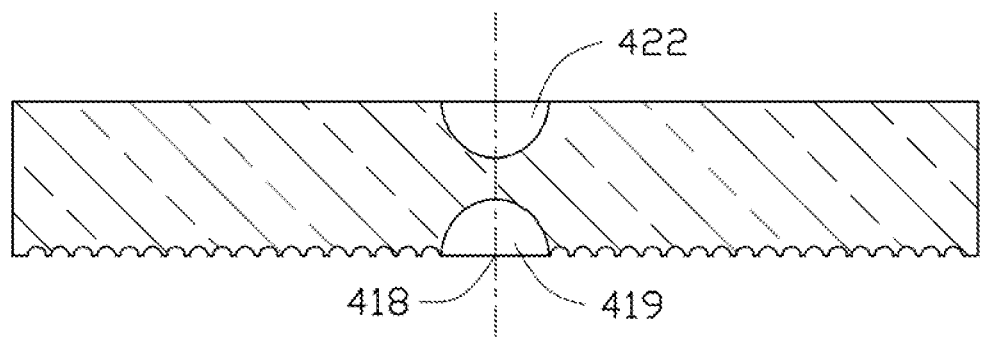
FIG. 11 is a cross-sectional view of one embodiment of a light guide plate of the backlight module of FIG. 7.

In one embodiment, the shape of the recess 422 and the accommodation 419 is a hemisphere as shown in FIG. 11.

Figure 12:
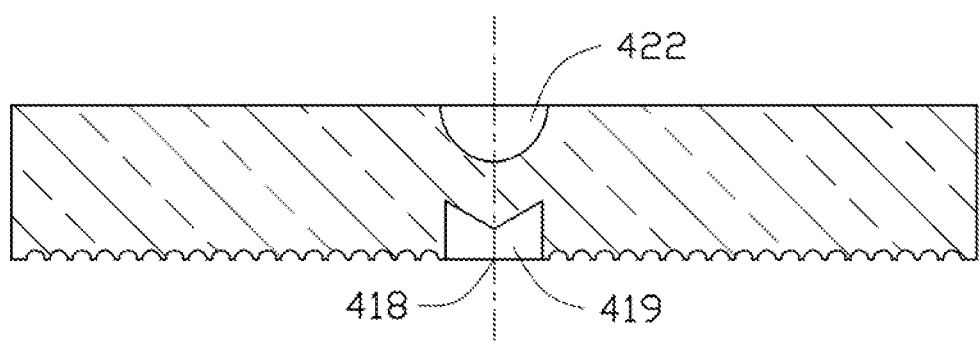
FIG. 12 is a cross-sectional view of one embodiment of a light guide plate of the backlight module of FIG. 7.

In one embodiment, the shape of the recess 422 is a hemisphere, and the shape of the accommodation 419 is a cylinder having a curve top surface as shown in FIG. 12.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A backlight module, comprising:

a light guide plate comprising a plurality of sub-light guide plates assembled side by side and optically isolated from each other, wherein each of the plurality of sub-light guide plates has a light inputting surface, a light outputting surface opposite to the light inputting surface, and at least one lateral side, wherein the light guide plate is an integrally joined structure having at least one groove dividing the light guide plate into the plurality of sub-light guide plates, and the at least one groove is filled with a reflective material so that the plurality of sub-light guide plates are optically isolated from each other, and the at least one groove does not pass through the light guide plate so that the plurality of sub-light guide plates have a joined common light inputting surface; and a plurality of light sources, wherein each one of the plurality of light sources is located adjacent to a light inputting surface of one corresponding sub-light guide plate and controlled independently.

2. The liquid crystal display of claim 1, wherein the at least one groove is a cross shaped groove so that the light guide plate is divided into four sub-light guide plates.

\* \* \* \* \*